A. B. Smith.
Carriage-Wheel.
Nº 78,143. Patented May 19, 1868.

Witnesses
Theo Tusche
Wm. Trewin

Inventor
A B Smith
Per Munn &Co
Attorneys

United States Patent Office.

ANSELMO B. SMITH, OF PLATTSMOUTH, NEBRASKA.

Letters Patent No. 78,143, dated May 19, 1868.

IMPROVEMENT IN CARRIAGE-WHEEL.

The Schedule referred to in these Letters Patent and making part of the same.

TO ALL WHOM IT MAY CONCERN:

Be it known that I, ANSELMO B. SMITH, of Plattsmouth, in the county of Cass, and State of Nebraska, have invented a new and useful Improvement in Carriage-Wheels; and I do hereby declare that the following is a full, clear, and exact description thereof, which will enable others skilled in the art to make and use the same, reference being had to the accompanying drawings, forming part of this specification.

This invention consists in a novel and improved manner of securing the spokes of wheels in a metallic hub, and in a peculiar construction of the hub, whereby a very strong and durable wheel is obtained, and one which may have its spokes adjusted to compensate for any shrinkage thereof, so as to avoid the loosening of the tire, and the necessary shrinking of the same, which is now required in wheels as ordinarily constructed. In the accompanying sheet of drawings—

Figure 1:
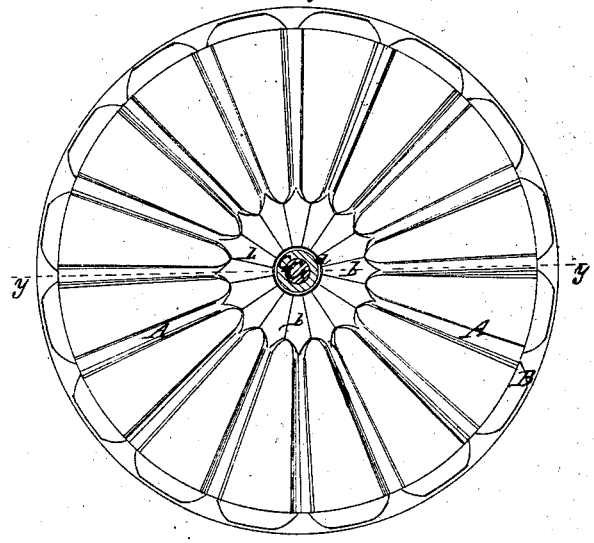
Figure 2:
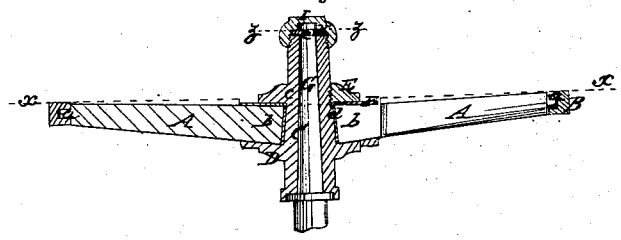

Figure 1 is a side sectional view of my invention, taken in the line $x\ x$, fig. 2.

Figure 2, a central section of the same, taken in the line $y\ y$ of fig. 1.

Figure 3:
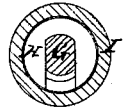

Figure 3, a section of the same, taken in the line $z\ z$, fig. 2.

Similar letters of reference indicate corresponding parts.

A represents the spokes of a wheel, and B the rim thereof. The rim may be exclusively of metal, or it may be of wood, and provided with a metal tire. The outer ends of the spokes have round tenons, $a$, cut on them, to fit in holes or mortises in the inner side of the rim, and the inner ends, $b$, of the spokes are of taper or wedge-shape in a direction transverse with the axle of the wheel, as shown in fig. 1, so that said ends $b$ may be fitted snugly together in close contact. These ends $b$, at their other sides, which are in planes longitudinal with the axle, are of dove-tail form, as shown clearly in fig. 1.

The metal hub of the wheel is composed of a tube, C, provided with a collar, D, which is of concave form at its inner side, that is to say, the side which abuts against the spokes, (see fig. 2,) and this concave surface corresponds to the bevel or inclination of the ends $b$ of the spokes, which bevel or inclination forms the dove-tail thereof.

On the tube C, some distance from the collar D, there is cut a screw, $c$, to receive a nut, E, and the tube C, between the collar D and the screw $c$, is of conical or taper form, and has a band, $d$, fitted upon it, said band being cut in order that it may fit snugly on the tube. This tube is passed through the circular opening formed at the inner ends of the spokes, said ends bearing against the band $d$, and the spokes are firmly retained between the two collars D and a loose collar, F, which is pressed up firmly against the spokes by the nut E.

The dove-tail form of the ends $b$ of the spokes, in connection with the concave collar D, effectually prevents the shifting or moving of the spokes in a longitudinal direction, and in case of the shrinking of the spokes, or of the rim, in case a wooden one be used, the spokes may be adjusted outward to tighten them and the tire by placing a thicker band, $d$, on the tube C.

The hub is retained on the wheel by having a groove, $e$, cut in the outer end of the axle G to receive a key or slotted disk, H, (see figs. 2 and 3,) the key or slotted disk being retained in position by a screw-cap, I, on the end of tube C, as shown clearly in fig. 2.

Having thus described my invention, what I claim as new, and desire to secure by Letters Patent, is—

1. The wheel, consisting of the bevelled and dove-tailed spokes $b$, with the inner inclined ends resting upon the collar $d$, surrounding the tube C, and secured in place against the concave collar G by means of the loose collar F and nut E, all constructed as described, for the purpose specified.

2. I further claim the securing of the hub on the axle by means of the slot $e$ in the axle G, the key or slotted disk H, and the screw-cap I, all arranged substantially as and for the purpose specified.

The above specification of my invention signed by me, this 14th day of September, 1867.

ANSELMO B. SMITH.

Witnesses:
H. D. HATHAWAY,
JAMES O'NEILL.